(12) United States Patent
Chu et al.

(10) Patent No.: US 8,427,944 B2
(45) Date of Patent: Apr. 23, 2013

(54) BITLOADING APPLIED TO NETWORK MULTICAST MESSAGES

(75) Inventors: Kenneth Chu, San Diego, CA (US); Ronald Lee, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 140 days.

(21) Appl. No.: 12/165,528

(22) Filed: Jun. 30, 2008

(65) Prior Publication Data

US 2009/0285212 A1 Nov. 19, 2009

Related U.S. Application Data

(60) Provisional application No. 61/054,433, filed on May 19, 2008.

(51) Int. Cl.
*H04J 3/14* (2006.01)
*H04L 12/28* (2006.01)
*H04L 12/56* (2006.01)

(52) U.S. Cl.
USPC ............................ 370/230; 370/252; 370/390

(58) Field of Classification Search ................ 370/480, 370/426, 400, 335, 344, 392, 230, 432, 223, 370/390, 235; 725/94, 95, 110
See application file for complete search history.

(56) References Cited

U.S. PATENT DOCUMENTS

| 6,366,554 | B1 | 4/2002 | Isaksson et al. |
| 7,912,056 | B1 * | 3/2011 | Brassem ........................ 370/390 |
| 8,085,802 | B1 * | 12/2011 | Monk et al. .................... 370/419 |
| 2003/0035378 | A1 * | 2/2003 | Nguyen et al. ................ 370/250 |
| 2005/0111535 | A1 | 5/2005 | Saey |
| 2005/0114904 | A1 | 5/2005 | Monk et al. |
| 2005/0198130 | A1 * | 9/2005 | Bosloy et al. ................. 709/204 |
| 2006/0146857 | A1 * | 7/2006 | Naik et al. ..................... 370/432 |
| 2007/0002859 | A1 * | 1/2007 | Corson et al. ................. 370/390 |
| 2007/0110176 | A1 | 5/2007 | Wu et al. |
| 2007/0115973 | A1 * | 5/2007 | Koga et al. .................... 370/389 |
| 2007/0204312 | A1 * | 8/2007 | Wheelock ........................ 725/94 |
| 2008/0062948 | A1 * | 3/2008 | Ponnuswamy ............... 370/342 |
| 2008/0181161 | A1 * | 7/2008 | Gi Kim et al. ................. 370/312 |
| 2008/0192668 | A1 * | 8/2008 | Okubo et al. ................. 370/312 |
| 2009/0022064 | A1 * | 1/2009 | Oron et al. .................... 370/253 |
| 2009/0092154 | A1 * | 4/2009 | Malik et al. ................... 370/480 |

* cited by examiner

*Primary Examiner* — Marcus R Smith
(74) *Attorney, Agent, or Firm* — Bruce Greenhaus; Richard Bachand; Berkeley Law & Technology Group LLP

(57) ABSTRACT

Different bitloading may be applied to different subsets of an Multicast (MC) group. Alternatively, the same bitloading may be applied to several or all of the subsets of an MC group. Such subset, or MC subgroup, may be formed as a result of considering bitloading capabilities of nodes of an MC group. In one embodiment, information is transmitted multiple times, once for each MC subgroup, each subgroup with a different bitloading. Such a process may improve overall throughput and efficiency for delivering packets to nodes of a network.

12 Claims, 5 Drawing Sheets

BITLOADING APPLIED TO NETWORK MULTICAST MESSAGES

CROSS-REFERENCE TO RELATED APPLICATIONS

This application claims priority to U.S. Provisional Patent Application Ser. No. 61/054,433, filed on May 19, 2008.

BACKGROUND

1. Field

The subject matter disclosed herein relates to determining bitloading to be applied to links to one or more nodes of a multicast group.

2. Information

As the popularity of multimedia has increased, the desire to distribute multimedia content, such as digital video, throughout a home or business using existing coaxial cable has also increased. One means for doing so is enabled by the use of devices developed, for example, according to the Multimedia over Coax Alliance (MoCA). Signals carrying multimedia content may enter a home or building at a point-of-entry (POE). From the POE, and within a home or building, such signals may be distributed to various terminals, or nodes that may be a part of a communication network, such as a broadband cable network (BCN), for example. Such a node may be connected to, or included within, various entities, such as cable converter boxes, televisions, video monitors, cable modems, cable phones, and video game consoles, just to name a few examples.

As defined herein, a multicast refers to the delivery of information to multiple destinations simultaneously. The term "multicast information" refers to the information that is sent to multiple destinations. When multicast information is transmitted, multicast messages carry the multicast information. In one case, multicast information is transmitted to nodes connected to a POE and communicating according to an internet protocol (IP). Nodes that are not identified as recipients of such multicast messages may nevertheless receive such messages. Such nodes may then drop, or otherwise ignore multicast messages not intended for that node.

Communications over a link between two nodes may utilize a signaling technique, such as the technique commonly known as "bitloading". The term "bitloading" as used herein refers to selecting a particular modulation to be used in communicating over a link between nodes. Such signaling techniques consider the characteristics of a particular link between nodes of the network. Link characteristics include the length, amount of attenuation, amount of noise, and/or any other features of the link between two particular nodes that may affect the transmission of a message between the two nodes. A modulation technique may be chosen, for example, to provide the highest data rate possible for transmitting data over the link, while maintaining an acceptable bit error rate.

Different links typically utilize different modulation schemes because the links may have different physical and/or electrical properties resulting in different characteristics for the link. The characteristics of each link that exists between each pair of nodes in the network will vary because of the paths through, attenuation of, and reflections caused by various elements in the link, such as cables, switches, terminals, connections, and other electrical components in the network. Transmission characteristics of a link may be described in terms of a signal-to-noise ratio (SNR), a bit-error rate (BER), and/or power level of a signal received at a node at one end of the link or the other, for example. It should be noted that the link from a first node to a second node may not have the same characteristics as the link in the reverse direction (from the second node to the first).

In one example of a system for communicating multimedia content within a home or business, communications over a BCN use bitloaded orthogonal frequency division multiplexing (OFDM). In this example, data is modulated on multiple carrier signals with different QAM constellations used on each carrier signal.

A multicast message typically originates at a first node and travels downstream to the other nodes on the network at a rate determined by the capability of a worst-case link between the originating node and each other node in order to ensure that each node will be able to receive the multicast message with the desired bit error rate. However, limiting the multicast message to the bitloading capability of the worst case link (sometimes referred to as the "Greatest Common Denominator" or "GCD") for each carrier signal means that the likelihood is that many of the carriers will be limited to relatively inefficient modulation (i.e., the ratio of the data to symbols is relatively low or said another way, the amount of data that can be sent using the same bandwidth is relatively low). Accordingly, there is a need for a more efficient way to send multicast information over a network using bitloading.

BRIEF DESCRIPTION OF THE FIGURES

Several embodiments will be described with reference to the following figures. These embodiments are not intended to limit the scope of the invention recited in the appended claims, but rather are provided as enabling examples of the invention recited in those claims. Accordingly, the scope of the invention claimed should be limited only by the language of the appended claims as interpreted in light of this description. Like reference numerals refer to like parts throughout the various figures unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components, and/or circuits have not been described in detail so as not to obscure claimed subject matter.

A "multicast (MC) group", as referred to herein, refers to a group of network nodes that are the intended recipients of an MC message. As will be described in greater detail below, in one particular example, different bitloading may be applied to different subsets of an MC group. Alternatively, the same bitloading may be applied to several or all of the subsets of an MC group. Such subsets, or MC subgroups, may be formed as a result of considering bitloading capabilities of nodes of an MC group. Transmitting information multiple times, once for each MC subgroup, each subgroup with a different bitloading, may be beneficial compared to, say, transmitting the information once to an entire MC group. Such a process may improve overall throughput and efficiency for delivering packets to nodes of a network, as explained below.

In one embodiment, determining the bitloading to be applied to an MC message depends on which nodes are in the MC group to which the message is being sent. Such a determination may ignore nodes outside of the MC group, so that overall bitloading may be optimized specifically for nodes in the MC group. For example, a particular signaling technique to transmit information over links of an MC group may be based upon capabilities of a lowest performing link to a node of the MC group. Such a technique may select a bitloading to provide from a source a sufficiently low BER, for example, for such a lowest performing link. Accordingly, bitloading of a multicast may generally be improved by reducing the number of nodes considered, since some of the ignored nodes may include such low performing links.

Figure 1:
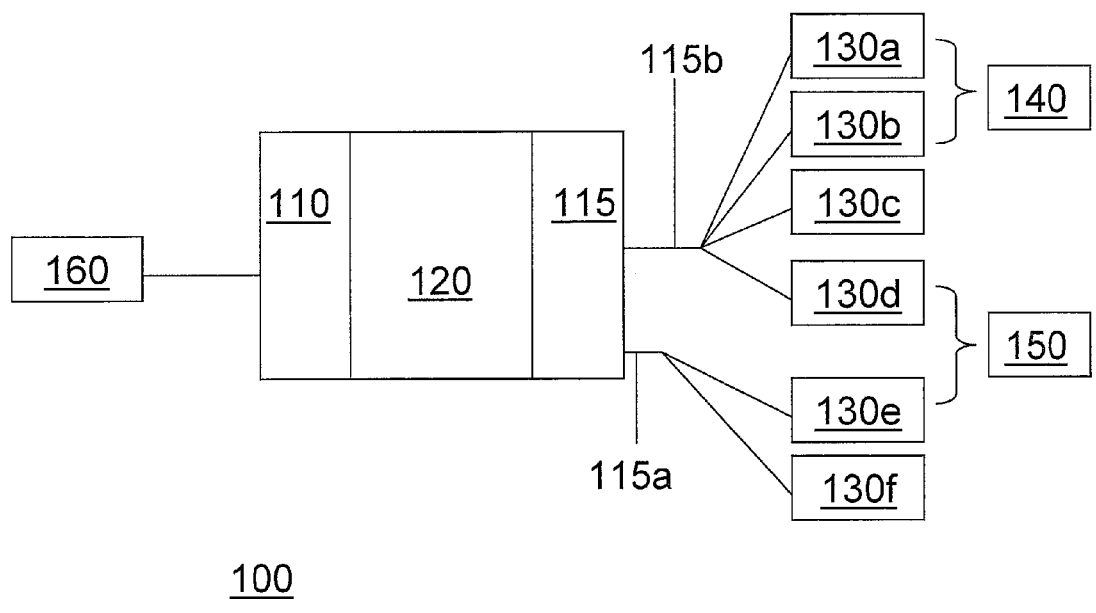
FIG. 1 is a schematic diagram illustrating a multicast network, according to an embodiment of the disclosed method and apparatus.

Referring to FIG. 1, a schematic diagram illustrates a network 100, such as a BCN, in accordance with particular embodiments of the disclosed method and apparatus. Network 100 may include an Access network and/or a Mesh network, for example. An Access network allows point to multipoint communications (typically from a network coordinator (NC) 120 to the other nodes in the network), whereas a Mesh network allows one node to communicate directly with another node. In an access network, the NC 120 receives information via communication port 110 from a multicast (MC) router 160. In a Mesh network, however, MC router 160 may be connected to NC 120 and/or a node. Such information, (referred to herein as MC messages), includes video packets and/or program guide data (e.g., as in IPTV), just to name a few examples. In one embodiment, communication port 110 and/or NC 120 are placed downstream of a POE (not shown) from MC router 160. In another embodiment, communication port 110 and/or NC 120 are upstream of such a POE. The NC 120 forwards at least a portion of the information through a downstream (DS) port 115 to one or more connected nodes 130a through 130f. Though clients 130a through 130f are illustrated in FIG. 1 as an example, an unlimited number of such clients may be connected to port 115. In one embodiment, NC 120 receives MC messages via coax cable and communication port 110 comprises a cable modem, for example. Communication port 110 is connected to and receives signals from one or more entities in addition to the MC router 160. In one embodiment, the MC router 160, the NC 120, and nodes 130 are part of a communication network. The DS port connections 115a and 115b depict examples of connections between the DS port 115 and downstream nodes 130. In one example, such connections include a splitter network to split an MC message into split MC messages that are passed downstream to the nodes 130. In FIG. 1, the nodes 130a, 130b, 130c, and 130d are connected to DS port 115 via DS port connection 115b, and nodes 130e and 130f are connected to the DS port 115 via the DS port connection 115a, although any number of nodes may be connected to the DS port 115 via any number of DS port connections and configurations. The number of nodes 130 and the number and configuration of DS port connections depicted in FIG. 1 is provided as but one example of the various embodiments possible. In one embodiment, a network as described above is configured according to the Multimedia over Coax Alliance (MoCA) standard, for example MoCA 1.1, though claimed subject matter is not limited to such examples.

Figure 2:
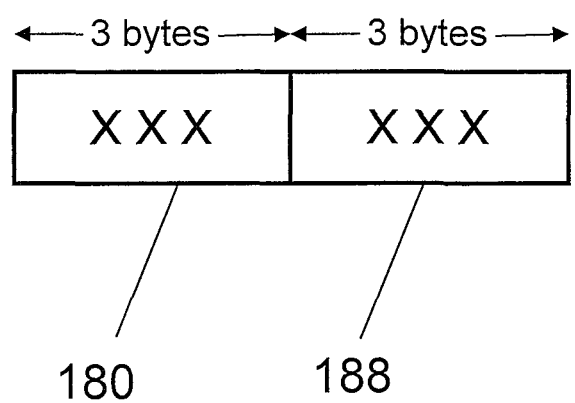
FIG. 2 is a schematic diagram illustrating a MAC address, according to an embodiment of the disclosed method and apparatus.

In one particular embodiment, the MC router 160 receives data traffic from an upstream video server (not shown) and provides data packets, such as a multicast data stream, onto a network 100. The MC router 160 comprises a multi-port switch/router to receive data traffic from one or more multicast servers. Upon receiving such data traffic, the MC router 160 subsequently routes traffic downstream to the nodes 130. In one example, video data streams, such as high-definition television (HDTV) signals, are differentiated from each other by a multicast group number included in a multicast address, such as a Media Access Control (MAC) address. An example of such an address is shown in FIG. 2, where "X" may represent an address byte. In this example, the first three bytes of the MAC address 180 are fixed, and the last three bytes 188 represent an MC group number. In one particular implementation, the lower 23-bits of a multicast address are copied into the lower 23-bits of an Ethernet multicast address. A multicast data stream comprises, for example, MPEG video transmitted in internet protocol (IP) multicasts, which make up a data stream. In this example, nodes downstream of multicast router 160, including nodes 130 downstream of NC 120, include homes, businesses, or any POE on a network capable of receiving multicasts.

In one embodiment, NC 120 communicates with connected nodes 130, though nodes 130 may or may not be capable of communicating with one another. In such a network, NC 120 monitors upstream communications from individual nodes 130 to the network. Such monitoring includes Internet Group Management Protocol (IGMP) snooping (see RFC 4541—Considerations for Internet Group Management Protocol (IGMP) and Multicast Listener Discovery (MLD) Snooping Switches. M. Christensen et al. May 2006; and RFC 3376—Internet Group Management Protocol, Version 3. B. Cain et al. October 2002, for example), known to one skilled in the art, though other processes for monitoring are possible. Nodes 130, or an entity downstream of any of nodes 130, may send an IGMP join command packet requesting to join an MC group. Similarly, nodes 130, or an entity downstream of any of nodes 130, may send an IGMP leave command packet requesting to leave an MC group. An IGMP join command packet, which includes a multicast group number, may be received by multicast router 160. According to one embodiment, IGMP snooping monitors IGMP join command packets transmitted by nodes 130. By this process, for example, NC 120 determines which particular nodes 130 request inclusion in an MC group associated with multicast router 160. NC 120 groups nodes in an MC group into subgroups. NC 120 associates such multicast (MC) subgroups with a channel identifier (ID) to represent such subgroups of nodes that request to receive a particular multicast. Such an MC subgroup having a unique channel ID, may indicate an application of a particular bitloading to be applied in forwarding MC messages on affected links, as explained below. It is noteworthy that not every node in an MC subgroup necessarily joins a Multicast group. If even one node in a multicast subgroup joins an IGMP multicast group, NC 120 may send multicast messages to the entire group so that the one node may receive it.

Bitloading of links to nodes of a particular MC subgroup associated with a particular channel ID may be determined by NC 120. Such a determination is performed, for example, by sending a probe signal along a link to each node, and measuring a response from associated nodes. For example, to determine the bitloading from a node X to a node Y, a bitloading probe is sent from node X to node Y. Node Y then receives the probe and measure it's SNR for each carrier that it uses in the RF channel. The measured SNR determines the receive bitloading to use on node Y for transmissions from node X. Node Y then sends a report, which contains the bitloading, back to node X. Node X then uses the bitloading of the report as the transmit bitloading for transmissions for node X to node Y.

In one embodiment, NC 120 places bitloading information of each MC subgroup in a look-up table stored in an associated memory. Such bitloading information includes, for example, a bitloading to be applied to an associated MC subgroup, a bitloading that links of each node in the MC subgroup may accommodate, which nodes are included in each subgroup, and/or a channel ID of each subgroup. Such a look-up table associates one or more channel ID's with an MC subgroup and bitloading information associated with the MC subgroup, for example. Such a process of using a channel ID to determine which bitloading to apply to which links to nodes involves information available at a data link layer, such as layer 2 in the Open Systems Interconnection Basic Reference (OSI) model or the five-layer TCP/IP model, known to one skilled in the art. Here, NC 120 selects a bitloading to apply in forwarding an MC message based upon a MAC address in a layer 2 header, such as an Ethernet multicast MAC address, for example. Such nodes, such as node 130*b* for example, included in MC subgroup 140, may request to receive a particular multicast (and, therefore, request to be part of an MC group). On the other hand, nodes that have not requested to receive the particular multicast may not be included in an MC subgroup, such as node 130*c*, for example.

An MC subgroup includes a population of nodes that request inclusion in an MC group. An MC group includes all or a portion of nodes 130 connected to DS port 115. In the example of FIG. 1, nodes 130*c* and 130*f* do not request to receive a particular multicast signal, wherein nodes 130*a*, 130*b*, 130*d*, and 130*e* do request to receive the multicast signal. Accordingly, 130*a*, 130*b*, 130*d*, and 130*e* be associated with an MC group for a particular MC, while nodes 130*c* and 130*f* are not included in the MC group for a particular multicast. Thus, NC 120 discriminates among nodes 130 to determine which nodes request to receive or not receive the particular multicast. Further, NC 120 associates nodes 130*a* and 130*b* with MC subgroup 140 and nodes 130*d* and 130*e* into MC subgroup 150. The reason for grouping into more than one subgroup, as in this example, will be explained below.

In one embodiment, NC 120 determines a bitloading to be applied for forwarding MC messages to nodes in an MC subgroup of nodes by first considering a performance of a link to the individual nodes in the MC subgroup. An MC subgroup comprises nodes having links of similar performance.

As mentioned above, a process of transmitting a multicast multiple times for multiple MC subgroups, each with a different bitloading, improves overall throughput and efficiency for delivering a multicast to nodes of a network. In one embodiment, NC 120 creates more than one MC subgroup by grouping together nodes of an MC group that have similar bitloading capabilities. Such a grouping process provide an MC subgroup that includes nodes having substantially equal bitloading capabilities so that a GCD bitloading is not substantially lower than that of the nodes of the MC subgroup. Though forming multiple MC subgroups may improve overall bitloading of an MC group, a tradeoff involves transmitting a multicast multiple times: Instead of a single multicast transmission to a single MC group, NC 120 transmits one multicast for each MC subgroup. Such a tradeoff, however, may be beneficial if throughput and efficiency are improved by forming MC subgroups from an MC group. For example, referring to FIG. 1, links to nodes 130*d* and 130*e* have similar bitloading profiles. Because of a similarity of bitloading profiles across carriers, nodes 130*d* and 130*e* are grouped together as MC subgroup 150, for example. Accordingly, NC 120 determines a bitloading to be applied in forwarding MC messages to MC subgroup 150 by considering bitloading corresponding to a channel ID of MC subgroup 150. In another example, links to nodes 130*a* and 130*b* have similar bitloading profiles, but are different than those of nodes in MC subgroup 150. Because of a similarity of bitloading profiles across carriers, nodes 130*a* and 130*b* are grouped together as another MC subgroup 140, for example. Accordingly, NC 120 determines a bitloading to be applied in forwarding MC messages to MC subgroup 140 by considering bitloading corresponding to a channel ID of MC subgroup 140. As a result of forming MC subgroups 140 and 150, NC 120 transmits a multicast twice, as in the example, but throughput and efficiency are improved compared to a single multicast transmission to a single MC group. Though the above two examples consider MC subgroups having two nodes, any number of nodes is possible, of course. Also, MC subgroups may include overlapping nodes, such that a node is included in two or more MC subgroups at a time.

Continuing with the example above, links to nodes 130*a* and 130*b*, grouped into MC subgroup 140, accommodate similar bitloading, while bitloading for links to nodes 130*d* and 130*e* are substantially different than that of nodes 130*a* and 130*b*. Nodes 130*d* and 130*e* are therefore grouped into MC subgroup 150, distinct from other MC subgroups, such as MC subgroup 140. Meanwhile, as indicated in FIG. 1, nodes 130*c* and 130*f* may not have requested to receive a particular multicast and are accordingly not included in an MC group or an MC subgroup for a particular multicast.

As mentioned above, NC 120 determines a single bitloading to be applied to each MC subgroup 140 and 150, which is based, at least in part, on performance of links to the nodes included in each respective MC subgroup. The bitloading applied to the MC subgroup is substantially equal to the bitloading that the weakest link of a node among the nodes of an MC subgroup can accommodate with an acceptable BER, for example. In other words, among nodes included in an MC subgroup, one node has an associated link having a lowest performance, and this lowest performing link determines a bitloading to be applied in forwarding MC messages to all nodes in the MC subgroup of nodes.

According to one embodiment, each MC subgroup 140 and 150 is assigned a channel ID associated with a bitloading value of the respective MC subgroup. In a particular implementation, there is a one-to-one correspondence between channel ID's and MC subgroups. NC 120, using information regarding bitloading of nodes of an MC subgroup, may apply the bitloading value, as discussed above, to a process of forwarding multicasts from NC 120 to nodes in the MC subgroup. Accordingly, among nodes of an MC group, overall multicast throughput may be improved by grouping nodes having links of similar performance into smaller MC subgroups.

Referring to an embodiment above, a node associated with an MC subgroup may exit the MC subgroup. This occurs in response to the node no longer requesting to receive a particular multicast, for example. Upon such an exit, performance of links to nodes in the MC subgroup is reassessed and a new bitloading value then applies in forwarding multicast messages to the nodes of the MC subgroup. NC 120 determines when a node requests to exit an MC subgroup using IGMP snooping, as discussed above. As a result of the exit, NC 120 refers to a look-up table to determine whether to change bitloading to be applied to a modified MC subgroup. Such a reassessment depends upon i) whether such a modification would be negligible considering a difference in bitloading of the exiting node to the next weakest node, and/or ii) a likelihood that the exiting node will return to the MC subgroup, for example. The term "population" of an MC subgroup as referred to herein means the number of nodes in the MC subgroup and a performance of their associated links in terms of what bitloading the links accommodates.

Figure 3:
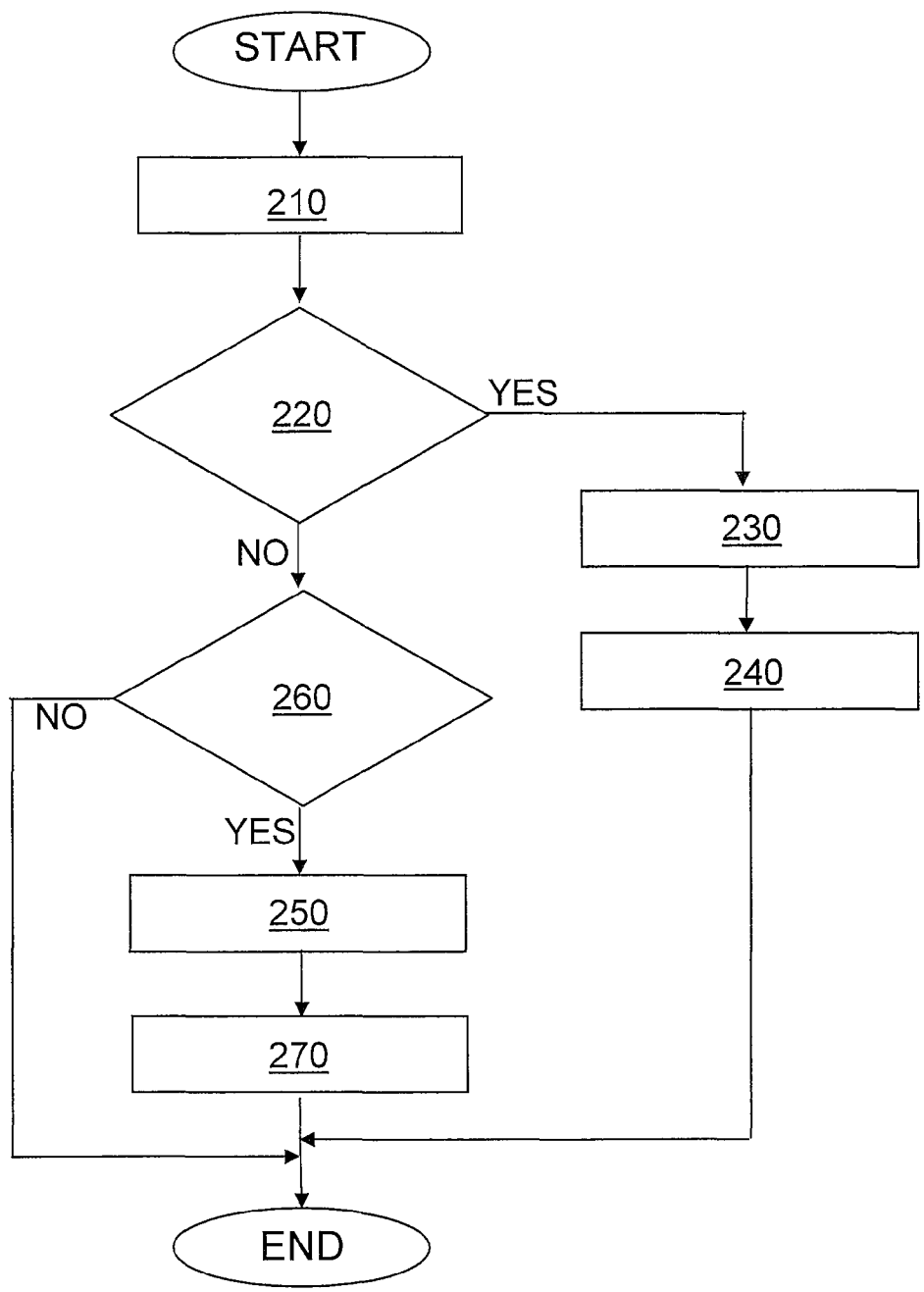
FIG. 3 is a flow diagram of a process to determine nodes in a multicast subgroup, according to an embodiment of the disclosed method and apparatus.

FIG. 3 is a flow diagram of a process 200 to determine nodes in an MC subgroup, according to an embodiment. NC 120 creates and/or modifies a look-up table to place bitloading information in association with respective channel ID's of MC subgroups as discussed above, for example. In block 210, a network coordinator monitors transmissions of downstream nodes, such as nodes 130 shown in FIG. 1 for example. Such monitoring includes IGMP snooping, as discussed above. By monitoring a particular node's upstream transmissions, for example, a network coordinator determines if the node requests to receive a particular multicast, at block 220. If so, then the network coordinator includes the node with an MC group of nodes that request to receive the same particular multicast. Upon inclusion of the node with an MC group, the network coordinator determines, at block 230, a bitloading that a link of the node accommodates, by using techniques discussed above. Of course, this is only an example of an event initiating determination of bitloading applied to a links of a node. At block 240, the network coordinator assigns a node of the MC group to an MC subgroup based, for example, on probe information from measuring bitloading capabilities of nodes in the MC group. The MC subgroup is associated with a channel identifier (ID), which has been assigned to the MC subgroup when the MC subgroup is created. A channel ID may be used to reference an MC group when communicating across the network.

If, as determined at block 220, a node does not request to receive a particular multicast, then the node is not added to an MC subgroup. Monitoring by a network coordinator determines, at block 260, whether a node is already included in a particular MC subgroup and requests to be removed. In such a case, at block 250, the network coordinator reassesses performance of links to the nodes remaining in the MC subgroup to determine a new bitloading to be applied to forwarding multicasts from the network coordinator to downstream nodes in the MC subgroup. The network controller chooses not to change the bitloading for the modified MC subgroup if the exiting one or more nodes are not among the nodes of the MC subgroup having the lowest performing links. As in block 270, a network coordinator notates the deletion of the recently exited node in a look-up table along with a channel ID and bitloading to be applied to the associated MC subgroup.

Figure 4:
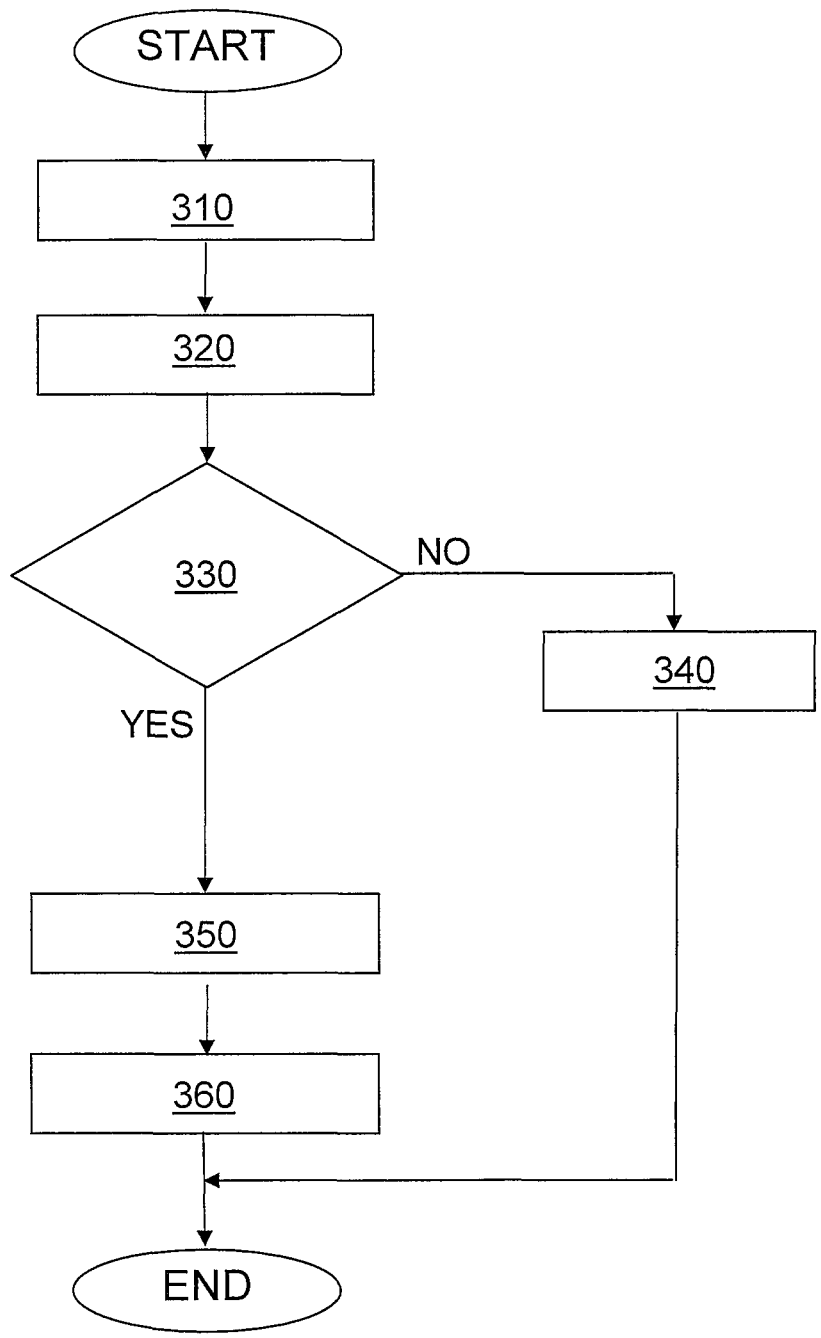
FIG. 4 is a flow diagram of a network coordinator process, according to an embodiment of the disclosed method and apparatus.

FIG. 4 is a flow diagram of a network coordinator process 300, according to an embodiment. In block 310, a network coordinator, such as NC 120 shown in FIG. 1 for example, receives a multicast. The multicast comprises a downstream message originating from an entity, such as an MC router, on a network such as a BCN, for example. At block 320, the network coordinator uses a look-up table, such as that described above, to determine which MC subgroup, and at what bitloading, to forward the multicast to a destination. For example, the multicast includes a multicast address that the network coordinator uses to find a corresponding MC subgroup and associated bitloading using a look-up table. A channel ID associates an MC subgroup with bitloading to be applied to the MC subgroup. A network coordinator also determines that the multicast includes a multicast address that is not included in the look-up table, which may be the outcome of the inquiry of Block 330. In such a case, the network coordinator may not forward the multicast, as indicated in block 340. On the other hand, if the network coordinator, perhaps using a look-up table, finds a match between the multicast address and one or more MC subgroups, then the network coordinator forwards the multicast to the one or more MC subgroups, as in block 360. While doing so, the network coordinator forwards the multicast to each of the one or more MC subgroups with a particular bitloading that corresponds to each of the one or more MC subgroups. Such particular bitloading is determined by a network coordinator using a look-up table that includes values determined by a process 200 shown in FIG. 3, as explained above. Prior to forwarding a multicast to an MC group, a network coordinator communicates with each node of an MC subgroup via a handshake, as depicted in block 350. Such a handshake associates a channel ID with a bitloading applied to the channel ID. For example, upon transmitting a multicast, an NC indicates a channel ID of the multicast in a media access plan (MAP) packet that coordinates all transmissions on the network. In one example, an NC issues a message that includes bitloading information of nodes on the network, such as what bitloading is to be used on each of the nodes. In this fashion, each node knows at what bitloading to expect to receive a multicast.

Figure 5:
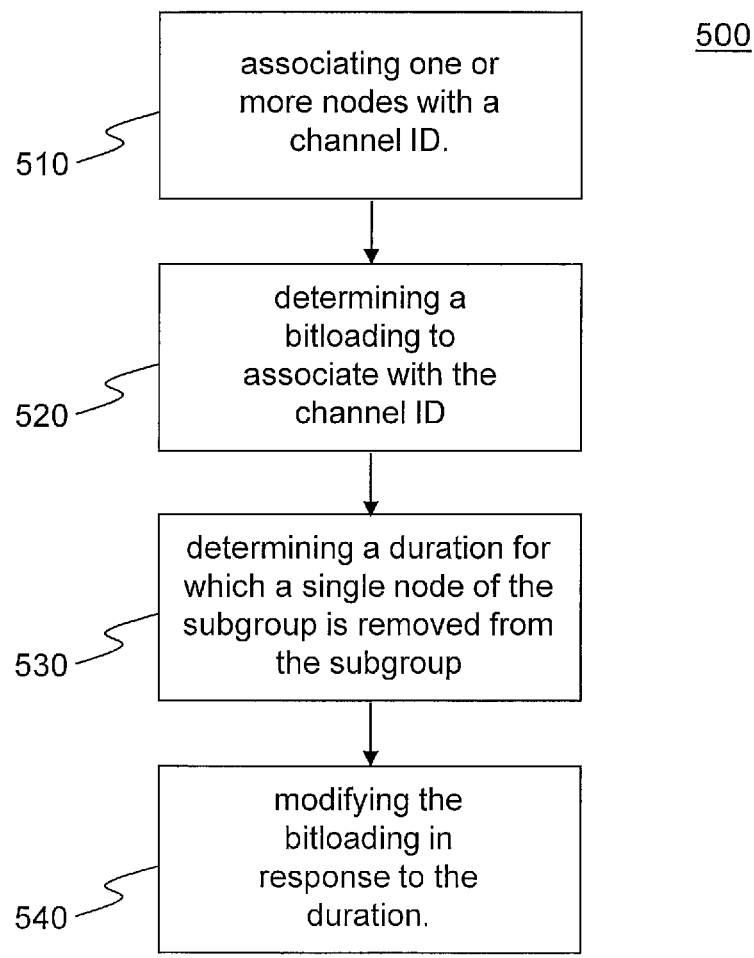
FIG. 5 is a flow diagram of a network coordinator process, according to another embodiment of the disclosed method and apparatus.

FIG. 5 is a flow diagram of a network coordinator process 500, according to an embodiment. At block 510, a network coordinator, such as NC 120 shown in FIG. 1 for example, may associate one or more nodes with a channel ID. Such nodes may comprise a subgroup of a multicast group comprising a plurality of nodes, for example. At block 520, a bitloading may be determined for which to associate with the channel ID. At block 530, a duration may be determined for which a single node of the subgroup is removed from the subgroup. At block 540, the bitloading may be modified in response to the duration.

While particular embodiments illustrated above relate to application of bitloading to nodes in a multicast group, such techniques may also be applied to bitloading of transmissions to nodes in a virtual LAN (VLAN) group. Here, such a VLAN refers to a group of hosts with a common set of requirements that communicate as if they were attached to the same wire, regardless of their physical location, for example. Though discussions of embodiments above considered multicast groups, VLAN groups may also be considered. A difference, however, involves a process of determining the groups: IGMP snooping is used to determine multicast groups, but a user/operator manually defines VLAN groups, including the nodes in the VLAN groups. Thereafter, processes described above for determining bitloading and assigning channel ID's applies to VLAN groups as well as multicast groups.

Some portions of the detailed description above are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
    associating one or more nodes with a channel identifier (ID), said one or more nodes comprising a subgroup of a multicast group comprising a plurality of nodes;
    transmitting one or more probe signals along links among said one or more nodes to determine particular modulation techniques for said links;
    determining which nodes of said plurality of nodes should be associated together in said subgroup based, at least in part, upon said particular modulation techniques for said links;
    detecting an exiting node among said nodes in said subgroup;
    determining a likelihood that said exiting node returns to said subgroup; and
    modifying said particular modulation techniques in response to said likelihood.

2. The method of claim 1, and further comprising snooping data traffic transmitted from said one or more nodes using Internet Group Management Protocol (IGMP) snooping, wherein said data traffic comprises an IGMP join command packet or an IGMP leave command packet.

3. The method of claim 2, wherein said IGMP join command packet or said IGMP leave command packet is associated with a multicast group number.

4. The method of claim 1, and further comprising snooping data traffic transmitted from said one or more nodes using Internet Group Management Protocol (IGMP) snooping, wherein said data traffic comprises multicast data.

5. The method of claim 1, and further comprising snooping data traffic transmitted from said one or more nodes using Internet Group Management Protocol (IGMP) snooping, wherein said data traffic comprises high-definition TV signals and/or video streaming.

6. A method, comprising:
    associating two or more nodes with a channel identifier (ID), said two or more nodes comprising a subgroup of a multicast group comprising a plurality of nodes;
    transmitting one or more probe signals along links among said two or more nodes to determine particular modulation techniques for said links; and
    determining which nodes of said plurality of nodes should be associated together in said subgroup based, at least in part, upon said particular modulation techniques for said links;
    detecting an exiting node among said nodes in said subgroup;
    determining a likelihood that said exiting node returns to said subgroup within a duration of time following removal of said exiting node from said subgroup; and
    modifying said particular modulation techniques in response to said likelihood.

7. A computer readable non-transitory medium having machine-readable instructions stored thereon which, if executed by a computing platform, are adapted to enable said computing platform to:
    associate one or more nodes with a channel identifier (ID), said one or more nodes comprising a subgroup of a multicast group comprising a plurality of nodes;
    initiate transmission of one or more probe signals along links among said one or more nodes to determine particular modulation techniques for said links;
    determine which nodes of said plurality of nodes should be associated together in said subgroup based, at least in part, upon said particular modulation techniques for said links;
    detect an exiting node among said nodes in said subgroup;
    determine a likelihood that said exiting node will return to said subgroup; and
    modify said particular modulation techniques in response to said likelihood.

8. The computer readable non-transitory medium of claim 7, wherein determining said particular modulation techniques for said links is based, at least in part, on a population of nodes included in said subgroup.

9. The computer readable non-transitory medium of claim 8, wherein said machine-readable instructions, if executed, are further adapted to modify said particular modulation techniques for said links in response to a change in said population of nodes.

10. An apparatus comprising:
    means for associating one or more nodes with a channel identifier (ID), said one or more nodes comprising a subgroup of a multicast group comprising a plurality of nodes;
    means for transmitting one or more probe signals along links among said one or more nodes to determine particular modulation techniques for said links;

means for determining which nodes of said plurality of nodes should be associated together in said subgroup based, at least in part, upon said particular modulation techniques for said links;

means for detecting an exiting node among said nodes in said subgroup;

means for determining a likelihood that said exiting node will return to said subgroup; and means for modifying said particular modulation techniques in response to said likelihood.

11. The apparatus of claim 10, and further comprising means for snooping data traffic transmitted from said one or more nodes using Internet Group Management Protocol (JUMP) snooping, wherein said data traffic includes an IGMP join command packet.

12. The apparatus of claim 11, wherein said IGMP join command packet includes a multicast group number.

* * * * *